United States Patent [19]
Murray

[11] 4,067,232
[45] Jan. 10, 1978

[54] INDICATION OF RATES OF FUEL CONSUMPTION

[75] Inventor: Alan B. Murray, Kloof, South Africa

[73] Assignee: Control Logic (Proprietary) Limited, South Africa

[21] Appl. No.: 707,341

[22] Filed: July 21, 1976

[30] Foreign Application Priority Data

July 23, 1975 South Africa .................. 75/4747

[51] Int. Cl.² ........................................... G01M 15/00
[52] U.S. Cl. .................................. 73/115; 340/52 R
[58] Field of Search ........................... 73/115, 116; 116/114 AE; 123/198 R; 340/52 R; 307/10 R

[56] References Cited
U.S. PATENT DOCUMENTS

| | | | |
|---|---|---|---|
| 3,906,437 | 9/1975 | Brandwein et al. | 73/117.3 X |
| 3,922,909 | 12/1975 | Dixson et al. | 73/115 |
| 3,937,202 | 2/1976 | Heath | 73/115 X |
| 3,983,533 | 9/1976 | Goszyk et al. | 123/198 R X |

FOREIGN PATENT DOCUMENTS

| | | |
|---|---|---|
| 1,282,137 | 7/1972 | United Kingdom. |
| 1,189,492 | 4/1970 | United Kingdom. |

*Primary Examiner*—Jerry W. Myracle
*Attorney, Agent, or Firm*—Stevens, Davis, Miller & Mosher

[57] ABSTRACT

This invention relates to a method of indicating changes in the rate of fuel consumption in internal combustion engines from a predetermined rate utilizing as a basis a predetermined vacuum in the engine manifold and using variations from such vacuum to operate a switch mechanism in at least one electrical circuit for a display means which indicates when the vacuum is above or below or at the predetermined level.

8 Claims, 1 Drawing Figure

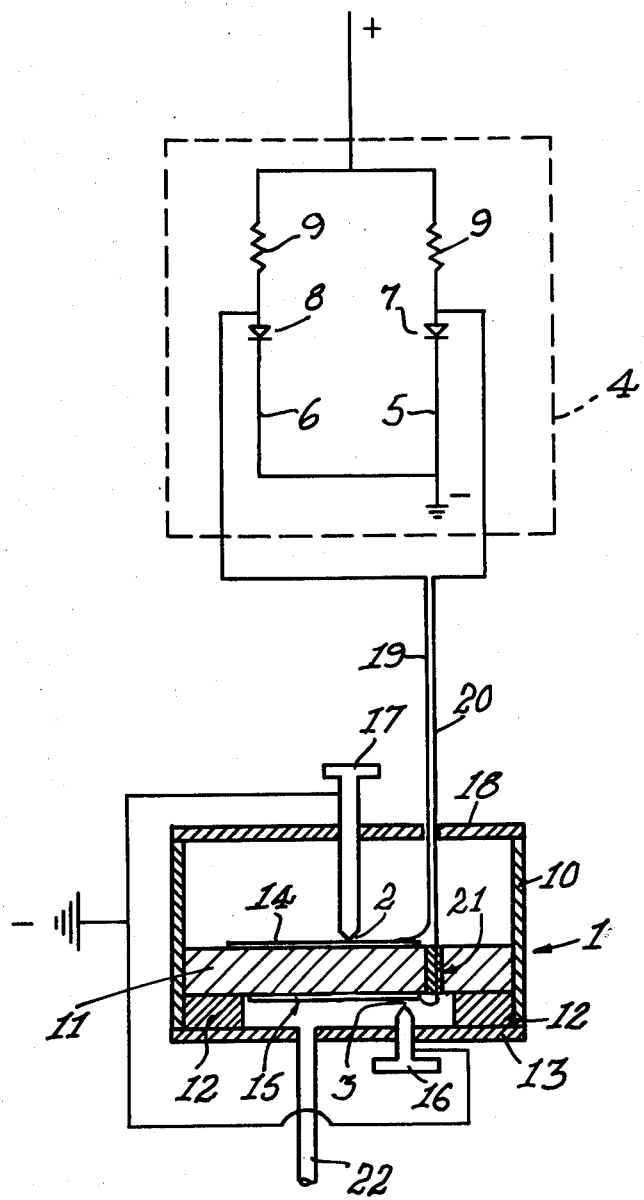

INDICATION OF RATES OF FUEL CONSUMPTION

FIELD OF THE INVENTION

The present invention relates to a method of, and a device for, indicating rates of fuel consumption in internal combustion engines.

OBJECTS AND SUMMARY OF THE INVENTION

It is the object of this invention to provide a simple method of and a device for indicating the changes in the rate of fuel comsumption from a predetermined rate.

In accordance with this invention a method of indicating changes in the rate of fuel consumption in internal combustion engines from a predetermined rate comprises using the vacuum in a manifold of the engine to operate, at a predetermined vacuum, the switch mechanism of at least one electrical circuit for a display means which indicates when the vacuum is above and below a predetermined level.

Further features of this aspect of the invention provide for said display means to emit light of changing colour when the vacuum varies above and below said predetermined level, and for said display means to include two electrical circuits each of which includes a light emitting diode.

The invention also provides a device for indicating changes in the rate of fuel consumptions in internal combustion engines from a predetermined rate comprising a vacuum-operated switch mechanism connected to at least one electrical circuit of a display means indicating when the vacuum is above and below a predetermined level.

Further features of this aspect of the invention provide for two independent electrical circuits each including a light emitting diode; the switch mechanism is adapted to activate the one circuit below a first predetermined level and to activate the other circuit above a second predetermined level such that both circuits are activated between the two levels.

BRIEF DESCRIPTION OF THE DRAWING

Various other objects, features, and attendant advantages of the present invention will be more fully appreciated as the same becomes better understood from the following detailed description when considered in connection with the accompanying drawing wherein:

The sole FIGURE is a schematic electrical circuit diagram of electrical apparatus assembled in accordance with the present invention so as to carry out the method thereof, and wherein the vacuum-operated switch mechanism thereof is shown in cross-section.

DETAILED DESCRIPTION OF THE PREFERRED EMBODIMENT

In this embodiment of the invention a device for indicating changes in the rate of fuel consumption of an internal combustion engine comprises a vacuum operated switch mechanism 1 including two sets of contact points 2 & 3. The contact points are each connected to a separate circuit of a display means generally indicated at 4.

Included in the display means are two circuits 5 and 6, the one circuit 5 including a red light emitting diode 7 and the other circuit 6 including a green light emitting diode 8. The electrical power supply for the circuits includes a 12 volt d.c. power supply and resistors 9, the resistors 9 being in series between the diodes 7 and 8 and the positive terminal of the power supply. The diodes are then grounded to the negative terminal of the supply.

As may be seen from the drawing and as will become more apparent hereinafter, both circuits are adapted to be alternatively closed or simultaneously opened at predetermined vacuum levels, and thus both diodes will accordingly limit or emit the light of their respective colours. The switch mechanism 1 is used to short out the power supply to the circuits 5 and 6 from points between the resistors 9 and the diodes 7 and 8.

In greater detail the switch mechanism 1 comprises a cylindrical housing 10. Within the housing 10 is a diaphragm 11 resting on a resilient elastomeric ring 12 which in turn rests on a base 13 of the housing 10. On each side of the diaphragm 11 is a conducting metal strip 14 and 15 as in a printed circuit board for example.

An adjustable contact pin 16 extends through the base 13 of the housing and terminates in a point just short of the metal strip 15, thus forming the set of electrical contacts 3. A similar contact pin 17 extends through the upper wall 18 and terminates in a point which is normally in contact with the metallic strip 14, thus forming the set of contact points 2. Both pins 16 and 17 are grounded to the negative terminal of the power supply.

Shorting wires 19 and 20 for both circuits extend through the wall 18 of the housing 10; the wire 19 for circuit 6 being connected to the metal strip 14 and the wire 20 for circuit 5 passing through a sealed hole 21 in the diaphragm and being connected to the metal strip 15.

The space between the diaphragm 11 and the base 13 is connected to a vacuum tube 22 which is adapted to be connected to an internal combustion engine inlet manifold (not shown); whereas the space between the diaphragm and the wall 18 is open to the atmosphere.

At low vacuum levels the switch mechanism is as shown in the FIGURE with contacts 2 closed and contacts 3 open, thus contacts 2 short out circuit 6 and its green light emitting diode 8 will not function. However, the diode 7 of circuit 5 will emit a red light. As the applied vacuum to the tube 22 is increased, the reduced pressure on the diaphragm 11 causes it to compress the resilient ring 12 and to open the set of contacts 2 thus causing the diode 8 to emit a green light. At this stage, both red and green lights are emitted by the respective diodes and are combined to present an effectively yellow light on the display.

Further increase of the vacuum causes further compression of the ring 12 until the set of contacts 3 are closed, thus shorting out circuit 5 and causing the red light emitting diode 7 to cease to function. At this stage only green light is emitted by the display 4. As both contact pins are adjustable the predetermined vacuum levels which the contacts operate may be varied.

It is to be appreciated that the rate of fuel consumption is proportional to the reduced pressure in an inlet manifold of an internal combustion engine so that the device, in operation, will give an indication to a person when the consumption rate is above or below the predetermined level. The display means thus emits a green light when the consumption rate is low, a red light when this rate is excessive, and a yellow light when the rate is moderate.

The device and its method of operation are simple and the invention provides useful means to enable a driver of a motor vehicle, for instance, to drive the vehicle economically.

Other embodiments are envisaged within the scope of the invention and include other switch mechanisms and display means.

What I claim as new and desire to secure by Letters Patent is:

1. A method of indicating changes in the rate of fuel consumption in internal combustion engines from a predetermined rate, wherein the rates of fuel consumption are proportional to the vacuum values in the inlet manifold of the engine, comprising the steps of:
   actuating an electrical switch mechanism, electrically connected to a single, light-emitting display means, to any one of a plurality of different positions by means of a vacuum value which is either above or below at least one predetermined vacuum level; and
   energizing said single display means comprising a plurality of light emitting diodes in a plurality of different modes, respectively corresponding to the different operational positions of said switch mechanism, so as to cause the color of the light emitted by said single display means to change dependent upon the alternative or simultaneous energization of said diodes and thereby visually indicate changes in the rate of said fuel consumption from said predetermined rate.

2. A method as set forth in claim 1, wherein:
   said electrical switch mechanism is movable to three different positions, and said display means operates in three correspondingly different modes, with respect to two predetermined vacuum levels; and
   the number of said diodes is two,
   whereby when the vacuum value is below a first predetermined level, only one of said diodes is energized in a first mode and a first color is emitted by said display means, when the vacuum value is above the second predetermined level, only the other one of said diodes is energized in a second mode and a second color is emitted by said display means, and when the vacuum value is between said predetermined levels, both of said diodes are energized in a third mode and a third color is emitted by said display means.

3. A method as set forth in claim 2, wherein:
   said first color is red, said second color is green, and said third color is yellow.

4. A device for indicating changes in the rate of fuel consumption in internal combustion engines from a predetermined rate, wherein the rates of fuel consumption are proportional to the vacuum values in the inlet manifold of the engine, comprising:
   display means for indicating changes in the rate of fuel consumption from a predetermined rate;
   two independent electrical circuits electrically connected to said display means;
   a light-emitting diode disposed within each of said circuits; and
   electrical switch means, operatively connected to the inlet manifold of the engine so as to be actuated by the vacuum values thereof and electrically connected to said two circuits, for activating one of said circuits when the vacuum value is below a first predetermined level, activating the other one of said circuits when the vacuum value is above a second predetermined level, and activating both of said circuits when the vacuum value is between said two predetermined levels.

5. A device for indicating changes in the rate of fuel consumption in internal combustion engines from a predetermined rate, wherein the rates of fuel consumption are proportional to the vacuum values in the inlet manifold of the engine, comprising:
   a vacuum-operated electrical switch mechanism operatively connected to the inlet manifold of the engine and capable of attaining any one of a plurality of different positions in response to vacuum values above and below at least one predetermined vacuum level within said inlet manifold;
   a single, light-emitting display means electrically connected to said switch mechanism; and
   electrical circuit means interconnecting said switch mechanism and said display means for energizing said display means in a plurality of different modes corresponding to the different operational positions of said switch mechanism so as to cause the color of the light emitted by said single display means to change and thereby visually indicate changes in the rate of said fuel consumption from said predetermined rate.

6. A device as set forth in claim 5, wherein:
   said display menas comprises a plurality of light-emitting diodes; and
   said electrical circuit means comprises means interconnecting said switch mechanism and said display means for alternatively or simultaneously energizing said diodes so as to determine the color emitted by said display means.

7. A device as set forth in claim 6, wherein:
   said switch mechanism is movable to three different positions in response to vacuum values above and below two predetermined vacuum levels;
   the number of said diodes is two; and
   said means within said electrical circuit means comprises two independent electrical circuits each of which includes one of said diodes,
   whereby, when the vacuum value is below a first predetermined level, only one of said diodes is energized in a first mode and a first color is emitted by said display means, when the vacuum value is above the second predetermined level, only the other one of said diodes is energized in a second mode and a second color is emitted by said display means, and when the vacuum value is between said levels, both of said diodes are energized in a third mode and a third color is emitted by said display means.

8. A device as set forth in claim 7, further comprising:
   electrical power supply means for supplying electrical power to said device;
   said switch mechanism comprises a diaphragm movable by said vacuum values and having conducting means disposed upon the opposite surfaces thereof;
   contact pins operatively associated with said conducting means so as to define electrical contact means therewith;
   electrical circuit means electrically connecting both of said contact pins to the negative terminal of said power supply means;
   electrical resistance means disposed in each of said two electrical circuits between each of said diodes and the positive terminal of said power supply means; and short circuiting means electrically connecting said conducting means to each of said two electrical circuits at points of said two circuits interposed between each of said diodes and said resistance means, whereby, when the vacuum value is below said first predetermined level, said diaphragm will be disposed at a first position such that one of the electrical contact means will be closed and the short circuiting means will prevent one of said diodes from being energized, when the vacuum value is above said second predetermined level, said diaphragm will be disposed at a second position such that the other one of said contact means will be closed and the short circuiting means will prevent the other one of said diodes from being energized, and when the vacuum value is between said two predetermined levels, said diaphragm will be disposed at a second position such that both of said contact means will be open and both diodes will be energized.

* * * * *